(12) United States Patent
Braddy

(10) Patent No.: US 11,521,126 B2
(45) Date of Patent: Dec. 6, 2022

(54) USER FRIENDLY SYSTEM TO GENERATE AND PROCESS MACHINE LEARNING REQUEST

(71) Applicant: BUURST, INC., Houston, TX (US)

(72) Inventor: Rick Gene Braddy, Cypress, TX (US)

(73) Assignee: BUURST, INC., Houston, TX (US)

( * ) Notice: Subject to any disclaimer, the term of this patent is extended or adjusted under 35 U.S.C. 154(b) by 282 days.

(21) Appl. No.: 16/880,656

(22) Filed: May 21, 2020

(65) Prior Publication Data

US 2021/0365833 A1    Nov. 25, 2021

(51) Int. Cl.
*H04L 41/50* (2022.01)
*G06N 20/00* (2019.01)
*G06F 16/23* (2019.01)
*G06F 9/48* (2006.01)
*G06Q 10/06* (2012.01)

(52) U.S. Cl.
CPC ........... *G06N 20/00* (2019.01); *G06F 9/4843* (2013.01); *G06F 16/2379* (2019.01); *H04L 41/5096* (2013.01); *G06Q 10/06315* (2013.01)

(58) Field of Classification Search
CPC ... G06N 20/00; G06F 9/4843; G06F 16/2379; G06F 9/5072; H04L 41/5096; H04L 41/16; H04L 41/50; G06Q 10/06315
See application file for complete search history.

(56) References Cited

U.S. PATENT DOCUMENTS

| | | |
|---|---|---|
| 2015/0205819 A1 | 7/2015 | Brand |
| 2017/0243132 A1* | 8/2017 | Sainani ............... G06N 20/00 |
| 2018/0254989 A1 | 9/2018 | Braddy et al. |
| 2018/0285263 A1 | 10/2018 | Ghazaleh |
| 2018/0332138 A1 | 11/2018 | Liu et al. |
| 2020/0134493 A1* | 4/2020 | Bhide ................... G06N 5/048 |

FOREIGN PATENT DOCUMENTS

WO    2020067938 A1    4/2020

OTHER PUBLICATIONS

International Search Report and Written Opinion for International application No. PCT/US2021/033459, dated Aug. 24, 2021, 10 pages.

* cited by examiner

*Primary Examiner* — Michael A Keller
(74) *Attorney, Agent, or Firm* — Polsinelli PC

(57) ABSTRACT

The present technology can provide a simple to use interface for receiving a selected machine learning task and one or more file pointers indicating a network location where data to be input in the machine learning task is stored. The present technology can also provide a connector that can ingest the input data from the network location; and automatically label the input data to be suitable for the selected machine learning task. The connector can further generate a machine learning compute request comprising a control information specifying one or more parameters for the selected machine learning task and a machine learning dataset generated from the labeled sequences of input data.

20 Claims, 10 Drawing Sheets

USER FRIENDLY SYSTEM TO GENERATE AND PROCESS MACHINE LEARNING REQUEST

TECHNICAL FIELD

The subject matter of this disclosure relates generally generating a user interface for defining a machine learning compute request, and translating the machine learning compute request for processing the machine learning compute request on the cloud, and more specifically to receiving the machine learning request and a dataset through the user interface where the user interface does not require knowledge of how to set up specific machine learning projects at a public cloud.

BACKGROUND

As public cloud adoption continues to accelerate, mainstream applications and services are being migrated into the public cloud at a record pace. Each cloud platform provides hundreds of services, each of which requires specialized knowledge to utilize them. However, this brings substantial complexity and increasingly steep learning curves to migrate the applications into the cloud and utilize these cloud-native applications.

From a customer's perspective, there are two major barriers to utilize popular cloud services such as Machine Learning (ML). First, acquiring, transforming, and integrating all kinds of data for ML service is challenging because of the high cost associated with processing data for the customized ML service needs. Second, even if the data is ready for an ML service to process, the average customer still cannot utilize ML service for their own needs because of the specialized skill sets involved to operate ML services.

SUMMARY

A method includes: receiving a selected machine learning task and one or more file pointers, each file pointer indicates a network location; for each given file pointer of the one or more file pointers perform the processes of: ingesting input data from the network location indicated by the given file pointer, and labeling input data with a label generated based on the given file pointer and the selected machine learning task; then generating, a machine learning compute request, wherein the machine learning compute request includes a control information specifying one or more parameters for the selected machine learning task and a machine learning dataset generated from the labeled sequences of input data.

A non-transitory computer-readable storage medium having stored therein instructions which, when executed by one or more processors, can cause the one or more processors to: determine, based on a control information of a machine learning compute request and a type of the selected machine learning task, a cloud connector for the machine learning compute request; construct, a plurality of cloud services for the machine learning compute request, the constructing based at least in part on the control information of the machine learning compute request; and process, the machine learning compute request by providing a machine learning dataset to one or more of the constructed plurality of cloud services.

A system that includes one or more processors, and at least one computer-readable storage medium having stored therein instructions which, when executed by the one or more processors, can cause the one or more processors to: receive a selected machine learning task and one or more file pointers, each file pointer indicating a network location; for each given file pointer of the one or more file pointers: ingest, by at least one of local connecters, a sequence of input data from the network location indicated by the given file pointer; and label, by at least one of local connecters, the sequence of input data with a label generated based on the given file pointer and the selected machine learning task; and generate, by at least one of local connecters, a machine learning compute request, the machine learning compute request comprising a control information specifying one or more parameters for the selected machine learning task and a machine learning dataset generated from the labeled sequences of input data.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
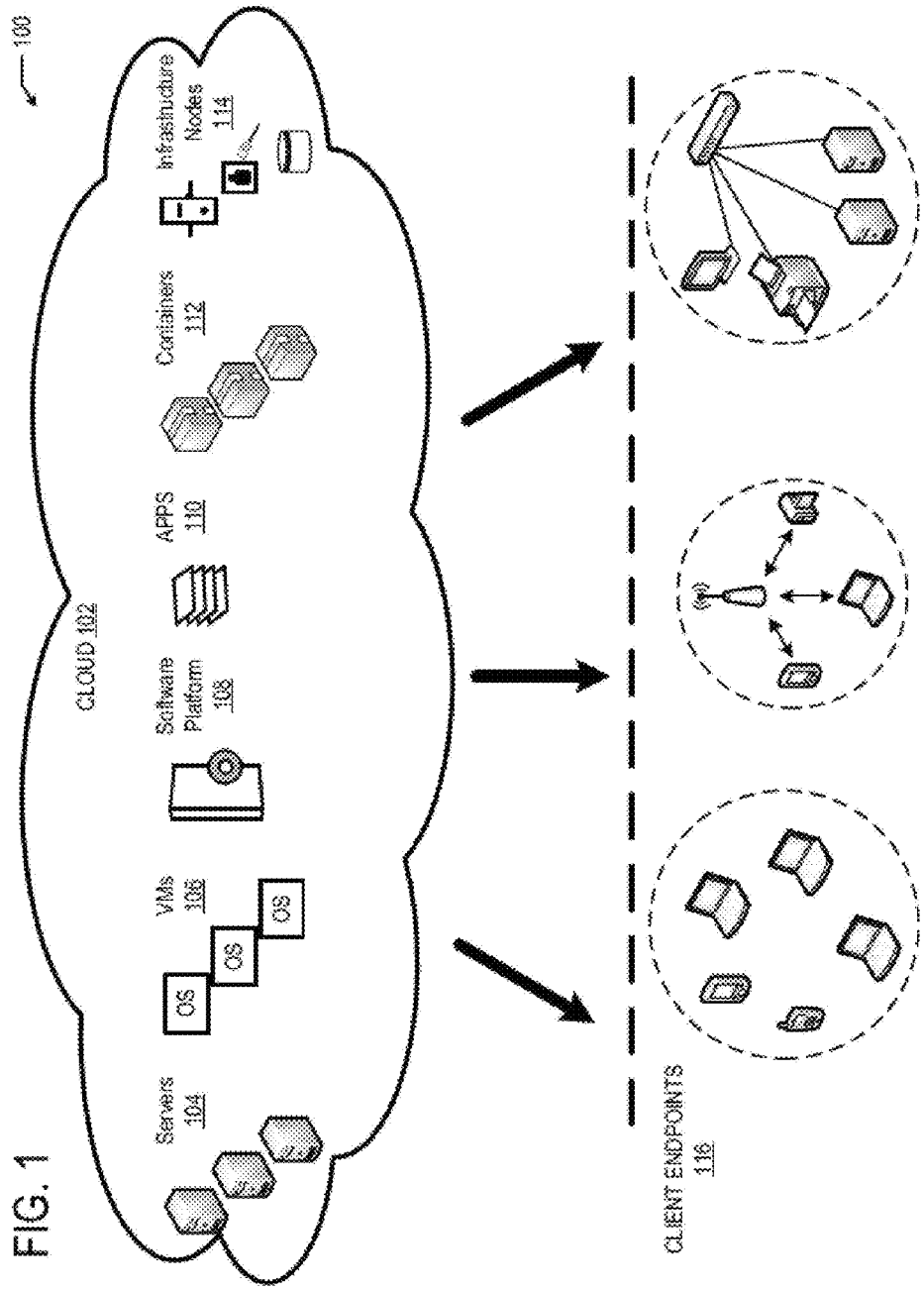
FIG. 1 illustrates an example cloud computing architecture in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art for simplifying the use of popular cloud services and accelerating data migration and integration for such services. One such cloud service is a machine-learning workload, which typically requires being an expert in creating public cloud workflows and domain-specific knowledge for how to create the particular type of machine-learning workload. The disclosed technology addresses the need in the art for generating a machine learning compute request through a user-friendly user interface, which is backed by software that supplies the necessary expertise to create the machine-learning workload at the cloud service. The disclosed technology provides two improvements. First, the disclosed technology provides an user-friendly user interface, so that generating a machine learning compute request does not require specialized machine learning knowledge. Second, the disclosed technology accelerates data migration and integration for machine learning tasks by utilizing connectors to connect different sections of the data flow. The present technology involves systems, methods, and computer-readable media for generating and processing a machine learning compute request.

FIG. 1 illustrates a diagram of an example cloud computing architecture 100. The architecture can include a cloud 102. The cloud 102 can include one or more private clouds, public clouds, and/or hybrid clouds. Moreover, the cloud 102 can include cloud elements such as servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with the cloud elements at cloud 102 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the cloud elements at cloud 102 as part of accessing network services through infrastructure intermediation messaging. Specifically, communications between the cloud elements at cloud 102 and the client endpoints 116 can be managed and otherwise controlled through a network infrastructure between the client endpoints 116 and the cloud 102. For example, any of a 5G infrastructure, an LTE infrastructure, and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 2:
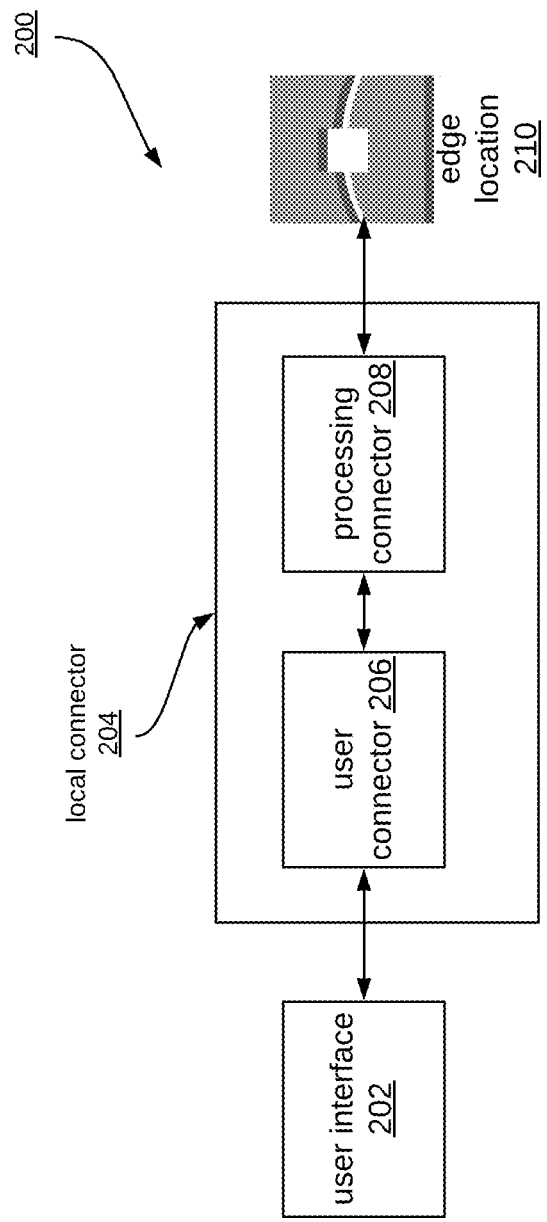
FIG. 2 illustrates an example of a local service architecture in accordance with various embodiments.

FIG. 2 illustrates an example of a local service architecture 200 in accordance with various embodiments of the present technology. However, one of ordinary skill in the art will understand that, for the local service architecture 200 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

A user can input data or get output data results through the user interface 202. In some embodiments, the user interface 202 can be a specific purpose application where data can be input or output through. For example, the user interface 202 can be part of a spreadsheet, such as a MICROSOFT EXCEL spreadsheet with add-ons/macros to guide the user to input the data. In some embodiments, the user interface 202 can be part of a website. In some embodiments, the user interface 202 can be a user interface of a service that is designed for input data and output result data. Some other examples of the user interface 202 can be based upon existing user interface features of other applications, such as TEAMS, SHAREPOINT, and DYNAMIC365, etc. The user interface 202 will be addressed in more detail with regard to FIGS. 6A, 6B, and 6C.

In some embodiments, the user interface 202 can direct the input and output data to a data storage for storing. In some embodiments, the user interface 202 can include options for the user to enter or browse for the location of a data storage where the input data is being stored. In some embodiments, the input data can be included in different files within an input folder, the output data can be included in different files within an output folder, and the folders can be stored in a tree directory of the data storage. For example, depending on the type of cloud services the user chooses, the application can create directories for the user to input data. The user can input data by dragging and dropping the input data files into the directories.

Figure 3:
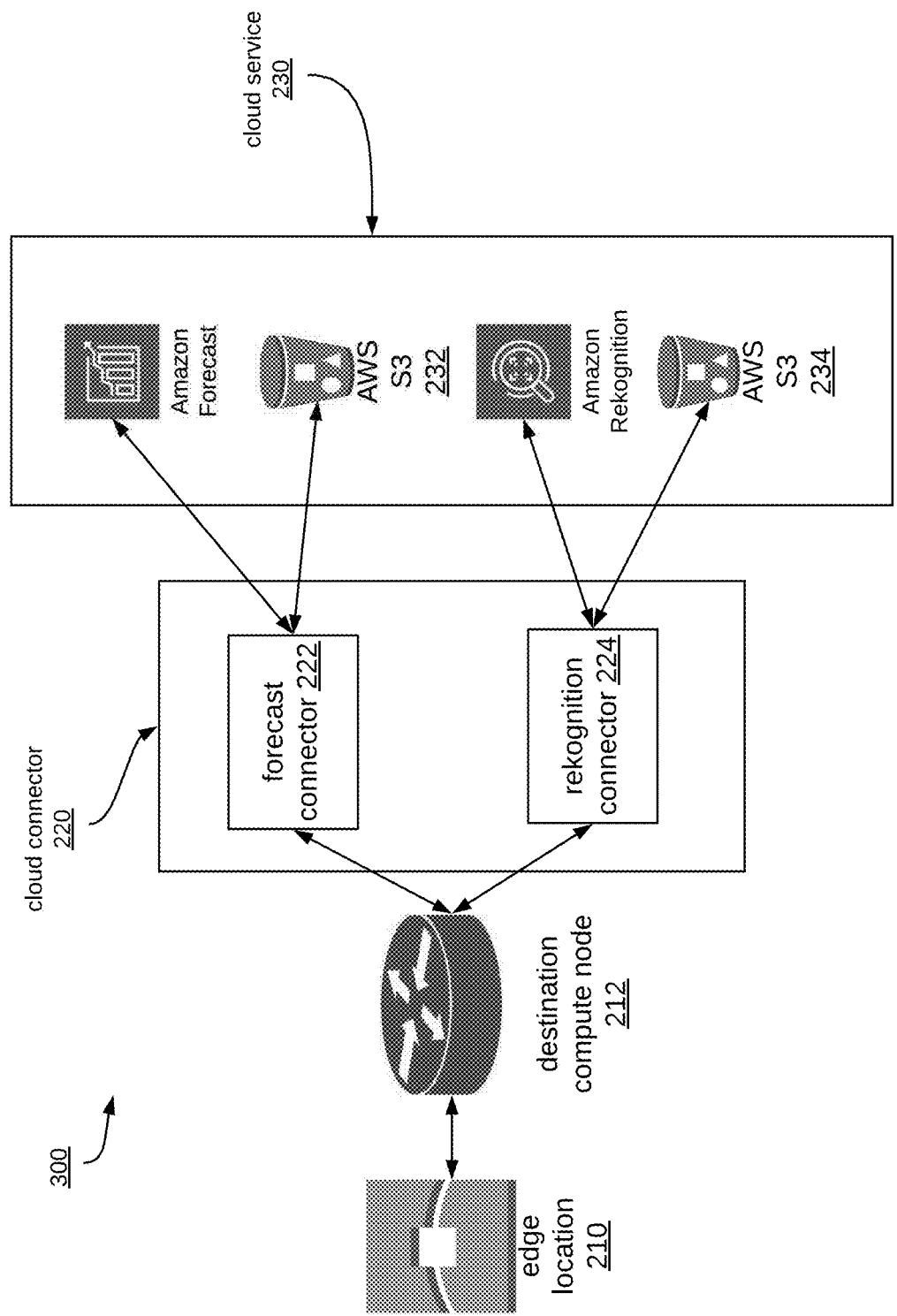
FIG. 3 illustrates an example of a cloud service based network architecture in accordance with various embodiments.

Connectors such as local connector 204 and cloud connector 220 as shown in FIGS. 2 and 3 are the fundamental building blocks of the present system. The local connector 204 resides locally in the local service architecture 200, and the cloud connector 220 resides on the cloud in the cloud service based network architecture 300. The connectors can include local connectors 204 such as the user connector 206, the processing connector 208 that reside locally or on the edge of the cloud network, and the cloud connectors 222 and 224 that reside in the cloud network.

From a system perspective, each connector is configured as a data processing unit of either the local service architecture 200 or the cloud service based network architecture 300. The connectors can receive data input, process data, output data, and direct data flow, etc. The connectors are also designed to encompass, manage, and orchestrate cloud services. These cloud services include, but are not limited to, AMAZON REKOGNITION®, AMAZON FORECAST, AMAZON SAGEMAKER®, AZURE MACHINE LEARNING STUDIO, TENSORFLOW®, KERAS®, AZURE DATALAKE, AZURE HDINSIGHTS, SALESFORCE®, MARKETO®, SAGE INTAACT®, MICROSOFT DYNAMICS CRM®, DROPBOX®, etc. In some embodiments, the connectors can also be self-contained data processors that manage data flows through the system. For example, the connectors can be SOFTNAS® FLEXFILES flows that are based upon "NIAGARAFILES" software (NiFi). Examples of the single service that the self-contained connectors are built upon can include, but are not limited to Network File System (NFS), Common Internet File System (CIFS), AMAZON SIMPLE STORAGE SERVICE® (S3), Binary Large OBject (Blob), AMAZON SIMPLE QUEUE SERVICE® (SQS), AWS Identity and Access Management (IAM) role, AZURE SERVICE PRINCIPLE®, etc. The connectors will be described from a user interface perspective with regard to FIGS. 6B and 6C.

Referring back to FIG. 2, user connector 206 can scan data from the data storage or output data to the data storage. Specifically, after the user inputs a data location through the user interface 202, the user connector 206 can scan the data at the designated data location. In some embodiments, user connector 206 can scan each document within a folder at the user-designated data location, and also scan each folder at the user-designated data location and traverse a tree directory. For example, the user connector 206 can scan the input data within each file folder that the user has input data. As an example, the file folders can be named as sales, finance, and warehouse inventory, etc. These file folders are a level below the input data file folder in a tree directory, and the user connector 206 can scan each of these folders first, and then scan the input data file folder or any other file folders that are on the same level as the input data file folder. Specifically, within each file folder, the user connector 206 can scan the input data location designated in a user interface 202 of a service, which can be provided, for example, by an EXCEL spreadsheet within each file folder. In some embodiments, the data scanning function can be automatic and periodic. The data scanning function can also help migrating the scanned data onto the cloud. For example, part or all of SOFTNAS LIFT AND SHIFT™ file migration function can be utilized, and user connector 206 can be configured to automatically scan all the user-designated data location every day for updated input data.

After the system completes the task and returns the output data, the user connector 206 can direct the output data as a task result in the user interface 202. For example, the user connector 206 can process and present the output data in an EXCEL spreadsheet or a user interface of a service. In some embodiments, the user connector 206 is a Common Internet File System (CIFS) user connector. In some embodiments, the input and output data processed by the user connector 206 include, but is not limited to, words, images, graphs, videos, etc. The user connector 206 can also apply transformation operations to the input data, this process will be described in detail with regard to FIG. 4.

The processing connector 208 can label the input data or conduct preliminary processing of the input data. In some embodiments, the processing connector 208 can label the input data to get it ready for training a machine learning (ML) model. In an example of a selected AMAZON REKOGNITION model for security scanning, the input images would be labeled as a set of "allowed object" images and a set of "disallowed object" images. The processing connector 208 would label images of books or cell phones as "allowed object" images and label images of guns and knives as "disallowed object" images.

In some embodiments, the processing connector 208 can also process the input data and generate summarized input data. This process can save the cost associated with uploading too much data to the cloud. For example, the input data can be sales data from the past year, and this data can be very detailed including each transaction and the corresponding information. For this large amount of input data, the processing connector 208 can first process it and generate a summarized daily or hourly average sales data for upload to the cloud. The processing connector 208 would then generate a machine learning compute request based on control information and a machine learning dataset. The control information can specify one or more parameters for the selected machine learning task, and the machine learning dataset is generated from the labeled sequences of input data. This process will be described in more detail with regard to FIG. 4. The edge location 210 is the edge of the cloud network. The user connector 206 and processing 208 would transmit the machine learning compute request to the edge location 210 for upload to the cloud.

FIG. 3 illustrates an example of a cloud service based network architecture 300 in accordance with various embodiments. However, one of ordinary skill in the art will understand that, for the cloud service architecture 300 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. Specifically, the cloud service architecture 300 can be implemented, at least in part, through an applicable network environment, such as the network architecture 100 shown in FIG. 1.

The edge location 210 can upload the input data to the destination compute node 212. There can be multiple destination compute nodes 212 in the cloud service architecture 300, and the cloud service architecture 300 determines which destination compute node to receive the processed input data, machine learning compute request, and the type of the selected machine learning task. In some embodiments, the destination compute node 212 can be a cloud router that can direct data flows to the services on the cloud. In some embodiments, before forwarding the machine learning compute request, the destination compute node 212 can divide it into two flows, such as the control information and the machine learning dataset. The destination compute node 212 can then determine which cloud connector corresponds to the appropriate cloud services to the current task based on the control information.

After determining the appropriate cloud connector, the destination compute node 212 directs the control information and the machine learning dataset to the appropriate cloud connector 220. Because each cloud connector 220 is designed to encompass, manage, and orchestrate a specific cloud service, the cloud service architecture 300 can include multiple different cloud connectors 220 each corresponds to a different cloud service. For example, forecast connector 222 orchestrates AMAZON FORECAST, and recognition connector 224 orchestrates AMAZON REKOGNITION®.

After the cloud connector 220 receives the control information and the machine learning dataset, it can direct the data flow to the corresponding cloud service 230. For example, direct data flow related to a forecast request to the AMAZON FORECAST service, and direct data flow related to a recognition request to the AMAZON REKOGNITION service. In some embodiments, it can also direct such data flow to the corresponding cloud storage unit for temporary storage before directing it to the corresponding services. For example, such cloud storage unit can be AMAZON S3 232 and 234 that corresponds to each of the cloud connectors 222 or 224. The cloud storage unit can also store intermediate processing results of the machine learning task.

The cloud connector 220 can manage the processing of the machine learning compute request and the construction of the corresponding cloud service. For example, forecast connector 222 can manage the processing of the machine learning request of a forecast model, orchestrate the training of such model based on the machine learning dataset, and manage the resulting forecast model to predict based on the control information. This process will be described in detail with regard to FIG. 5.

As addressed previously, there is a need in the art for simplifying the use of popular cloud services and accelerating data migration and integration for such services. In particular, the need for a user friendly user interface to generate a machine learning compute request that is understandable to an average person.

The present technology includes systems, methods, and computer-readable media for solving these problems/discrepancies.

Figure 4:
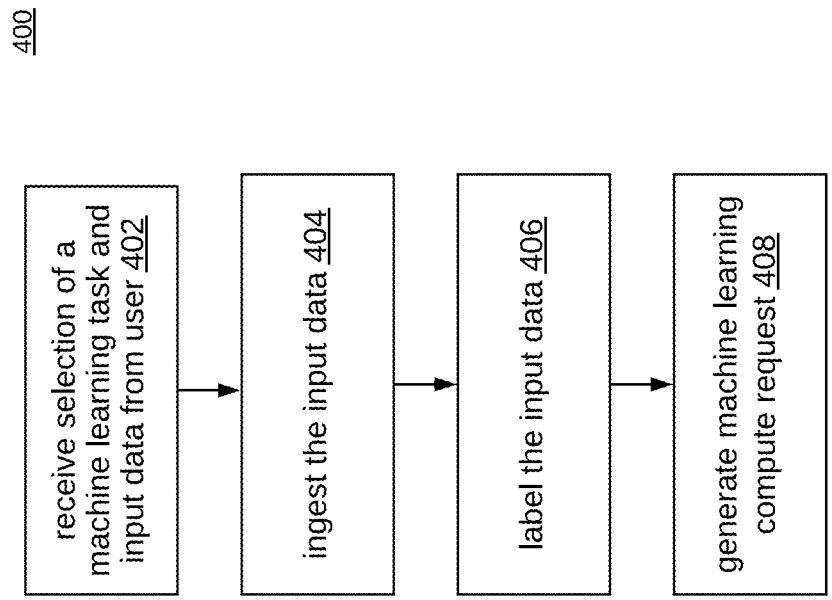
FIG. 4 illustrates an example method for generating a machine learning compute request locally and at the edge of the cloud in accordance with various embodiments.

FIG. 4 illustrates an example method 400 for generating a machine learning compute request locally and at the edge of the cloud in accordance with various embodiments. The method shown in FIG. 4 will be described with regard to FIG. 2 and FIG. 3. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated. In some embodiments, the user interface, user connector, and the processing connector can be the user interface 202, user connector 204, and the processing connector 206 as shown in FIG. 3.

The user interface receives 402 selection/input of a machine learning task and one or more file pointers from a user. In some embodiments, the user interface includes different options of machine learning task types for the user to choose from. For example, the different options of machine learning task types include forecast, recognition, regression, neural network, classification, clustering, and dimensionality reduction. In some embodiments, the user interface can include a drop-down menu that includes the different options of machine learning task types for the user to click on. In some embodiments, the user interface can include an option for the user to select a service provider, such as AWS or AZURE, etc.

The file pointers can include raw input data or a link to the input data that is stored at a network location. The input data can include either unstructured file or structured data, such as Structured Query Language (SQL) database. In some embodiments, the user can input the data into an input template and save the input template in an input folder. For example, the input template is an EXCEL spreadsheet with directions to guide the user to input different data into different columns or rows. In some embodiments, because the size of the input data is too large, the user can also input links of the input data into the input template. For example, the user can input a link to sales data within a period of time stored in a sales management and tracking platform such as SALESFORCE. The input folder can include a directory that includes multiple folders in a tree structure. For example, a general input folder includes a sales data folder and a website log data folder for input of corresponding data. In some embodiments, the user can also input data directly through the user interface of a service.

Then, the user connector ingests 404 a sequence of the input data from the network location indicated by the given file pointer. In some embodiments, the user connector can periodically scan each input template to ingest the input data. In some embodiments, when the user input is a link to raw data, the user connector automatically follows the link and extracts the data through the destination of the link. For example, the user connector can follow a link to SALESFORCE, use the login information stored on the user device, and extract the related data as indicated in the user interface. In some embodiments, the network location of the input data could include network file share locations. Examples of the network file share locations can include network accessible folders such as WINDOWS mapped drive, WINDOWS Universal Naming convention (UNC) path, network mount point, SHAREPOINT folder, TEAMS file folder, DROP- BOX folder, or BOX folder. For security purposes, the user interface 202 can also request user authentication before the user connector proceeds to scan such data. In some embodiments, the order of the scanning and ingesting of data from different files or folders can be set up by a network operator through the backend. After ingesting the input data, the user connector transmits the input data to the processing connector.

The user connector can also apply transformation operations to the scanned sequence of input data to further ingest the input data. The transformation operations are selected based on the type of the selected machine learning task, such as reorganizing the input data according to the processing requirement of the cloud service that would train the selected machine learning task. The transformation operations are also selected based on the content-type attribute of the input data. For example, if the input data are JPEG images, the transformation operations only applicable to text format data will be ruled out as options. These transformation operations can include, but are not limited to, feature extraction, feature selection, dimensionality reduction, etc. In an example of applying feature extraction on input data in a text format, when the user selects a machine learning task with a regression model to predict the correlation between sales number from a customer and how often the customer visited the company's website, the user connector can scan annual sales number of all customers and the website log from the user interface as input data. The user connector can then apply feature extraction on the annual sales number of all customers to achieve annual sales data per customer. Specifically, the user connector can extract annual sale number for each specific customer based on preset common parameters such as payment method and information associated with a sale, or whether a company is a subsidiary of another company.

After the user connector ingests the sequence of input data, the input data is transmitted to the processing connector for further processing. The processing connector labels 306 the sequence of input data with a label generated based on the given file pointer and the selected machine learning task. In some embodiments, the input data can be automatically labeled based on the type of machine learning model the user selected. The labels for the sequences of input data can also be generated based further on a configuration mapping between given ones of the file pointers and required input formats of the selected machine learning task. The configuration mapping is received from a user input connector. In some embodiments, the configuration mapping can include instructions on how to organize the labeled data and which format is appropriate for the selected type of machine learning task. For example, annual sales data acquired from Salesforce can include a lot of details. A configuration mapping can include instructions on organizing the sales data into each client group, or into a time series.

The processing connector generates 408 a machine learning compute request. The machine learning compute request is generated based on control information specifying one or more parameters for the selected machine learning task and a machine learning dataset generated from the labeled sequences of input data. In some embodiments, the control information specifies parameters such as maximum ML model size, maximum number of passes over training data, shuffle type, regularization type and amount, etc. In an example request for training a ML model to show a correlation between sales data and company website log data, the control information can specify that the maximum ML model size is for one year from the date of the request, and the regularization type is L1 in AWS to reduce noise.

After generating the machine learning compute request, the processing connector can send the labeled and processed data directly to the cloud or send it to an edge cloud connector. At this point, generating the machine learning compute request performed locally and at the edge of the cloud is complete.

Figure 5:
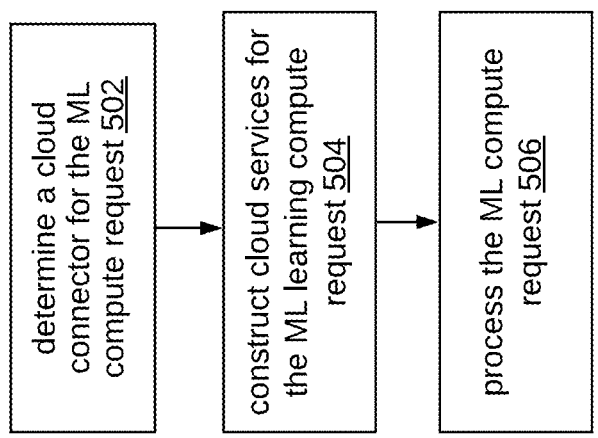
FIG. 5 illustrates an example method for processing the machine learning compute request on the cloud in accordance with various embodiments.

FIG. 5 illustrates an example method for processing the machine learning compute request on the cloud in accordance with various embodiments. The method shown in FIG. 5 will be described with regard to FIG. 3. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated. In some embodiments, the destination compute node, the cloud connector can be the destination compute node 210, the forecast connector 214, the recognition connector 216, and other cloud connectors 218 as shown in FIG. 3.

A destination compute node can determine 502 a cloud connector for the machine learning compute request. This determination 502 is based on the control information of the machine learning compute request and a type of the selected machine learning task. After determination, the destination compute node transmits the machine learning compute request to the cloud connector associated with the type of the selected machine learning task. For example, if the selected type of machine learning task is a forecast task, the destination compute node 210 can determine that the appropriate cloud service is the Amazon Forecast. Thus, the destination compute node 210 will transmit the machine learning compute request to the forecast connector 214 for further processing.

After receiving the machine learning compute request, the cloud connector can forward it to a corresponding cloud storage to temporarily store the data associated with the machine learning compute request. Then, the cloud connector can construct 504 cloud services for the machine learning compute request. The construction 504 of cloud services is based at least in part on the control information of the machine learning compute request. The cloud connector also manages the construction of the cloud services and the processing of the machine learning compute request. In some embodiments, the cloud connector generates a CloudFormation template (CFT) to construct the cloud services related to AWS. For cloud services related to AZURE, the cloud connector can also generate an AZURE RESOURCE MANAGER (ARM) template. Constructing 504 of cloud service also includes organizing and allocating data processes. Specifically, the CFT dynamically organizes data associated from the control information and the machine learning dataset, and allocates the data within the CFT in an order and format that can be processed by the cloud service. The organizing and allocating processes are tailored towards to a particular cloud service. After these processes, the CFT can trigger the construction of the plurality of cloud services and control the processing of the machine learning compute request based on the control information.

The cloud connector processes 506 the machine learning compute request by providing the machine learning dataset to one or more of the constructed plurality of cloud services. In some embodiments, the cloud connector also provides the corresponding CFT to the cloud service for more efficient processing. The corresponding cloud service will then conduct the machine learning task as instructed, and produce a ML result. In some embodiments, the ML result can include a ML model or a result of applying the ML model to a set of data. The result will then be transmitted back to the user interface for the customer. Such transmission can be in a reverse order via some of all of the components as shown in the local service architecture 200A of FIG. 2A and the cloud service based network architecture 200B of FIG. 2B.

Figure 6A:
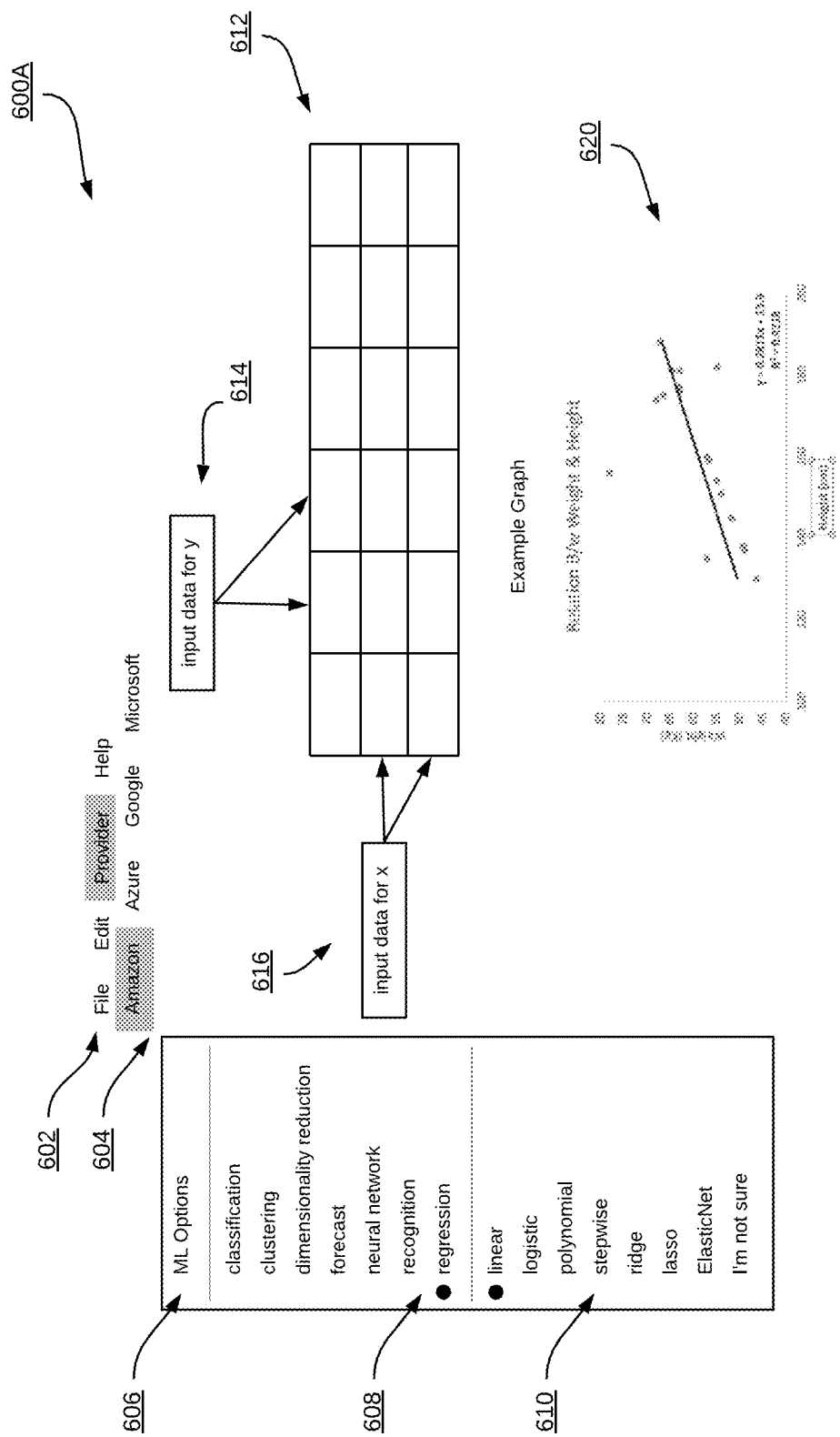
FIG. 6A illustrates an example user interface in accordance with various embodiments.

FIG. 6A illustrates an example user interface 600A in accordance with various embodiments of the present technology. In some embodiments, this user interface can be the user interface 202 of FIG. 2. However, one of ordinary skill in the art will understand that, for the user interface 600A and any other presentation system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

When a user starts the process of generating a machine learning compute request via the user interface 600A, the user can first choose one of the options on the main menu 602. The main menu 602 includes, but is not limited to, options of "file," "edit," "provider," and "help." When the user selects the option "provider" (indicated by the gray box), the provider menu 604 can automatically appear below the main menu 602. The provider menu 604 includes, but is not limited to, options of "AMAZON," "AZURE," "GOOGLE," and "MICROSOFT." Each of the options might include different selections for the corresponding services associated with each provider. When the user selects the option "AMAZON" (indicated by the gray box), a service drop down menu 606 will automatically appear in the user interface 600A.

The service drop down menu 606 is titled "ML options." Below the title, there is a ML option menu 608 to show the available ML options from the selected provider "AMAZON." The ML option menu 608 includes, but is not limited to, options of "classification," "clustering," "dimensionality reduction," "forecast," "neural network," "recognition," and "regression." In some embodiments, there can be more or less options shown to the user, depending on the user's classification. For example, there can be more options for a "Premium user," but less options for a "Regular user." After the user selects the option "regression" (indicated by the black dot), a regression drop-down menu 610 will automatically appear below the ML option menu 608. The regression drop-down menu 610 includes the available types of regression models. The regression drop-down menu 610 includes, but is not limited to, options of "linear," "logistic," "polynomial," "stepwise," "ridge," "lasso," "ElasticNet," and "I'm not sure." The "I'm not sure" option is for users who are not sure about which type of regression model is the best option. In some embodiments, after the user selects the "I'm not sure" option, the system will automatically generate a list of recommended types of regression models, or automatically choose an available type of regression model for the user.

After the user selects option "linear" (indicated by the black dot), both the input spreadsheet 612 and the example graph 620 will automatically appear in the middle of the user interface 600A. The input spreadsheet 612 further includes indicators 614 and 616. The indicator 614 indicates where to input the data for y-axis in the linear regression model to the user, whereas the indicator 616 indicates where to input the data for x-axis in the linear regression model to the user. In some embodiments, there can be more or fewer indicators to help the user depending on the selected ML options and the selected type of the specific ML option. Example graph 620 gives the user an example of how the selected linear regression model will look at on a graph, and how the corresponding data input for the x axis and y axis interact with each other.

Figure 6B:
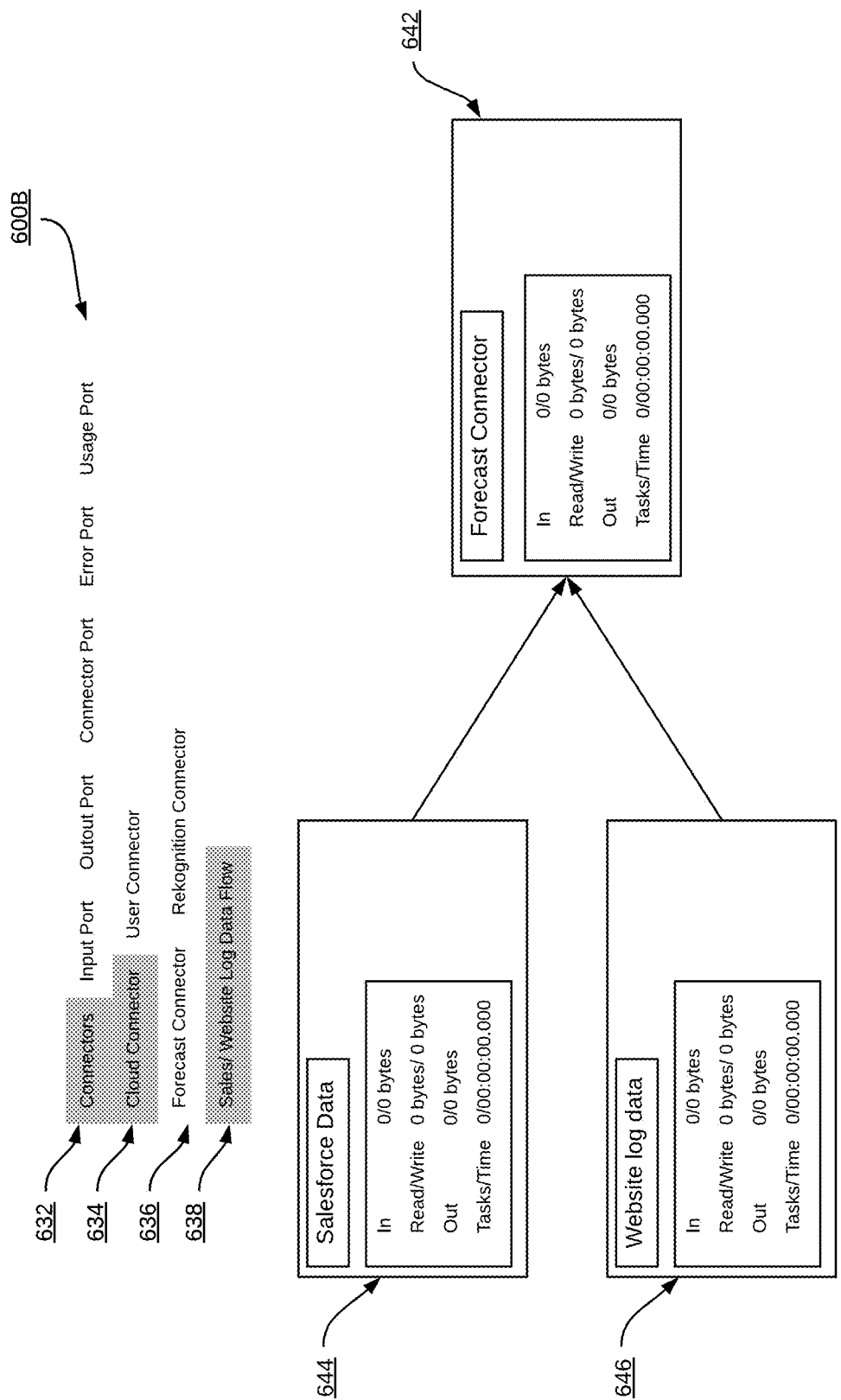
FIG. 6B illustrates another example user interface in accordance with various embodiments.

FIG. 6B illustrates an example user interface 600B in accordance with various embodiments of the present technology. However, one of ordinary skill in the art will understand that, for the user interface 600B and any other presentation system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

The menu section on top of the user interface 600B includes main menu 632, connectors menu 634, cloud connector menu 636, and directory of connectors 638. The main menu 632 includes, but is not limited to, options of "Connectors," "Input Port," "Output Port," "Connector Port," "Error Port," and "Usage Port." In this example, the user selected the "Connectors" option and the connectors menu 634 is displayed below the main menu 632. The connectors menu 634 includes, but is not limited to, options of "Cloud Connector" and "User Connector." In this example, the user selected the "Cloud Connector" option and the cloud connector menu 636 is displayed below the connectors menu 634. The cloud connector menu includes, but is not limited to, options of "Forecast Connector" and "Rekognition Connector." The directory of connectors 638 is displayed as "Sales/Website Log Data Flow." This name can be chosen by the user and updated at any time.

The main section below the menu section is where the user can organize the data flow for the ML compute task. By providing a data flow diagram in this user interface, the system can make it easy for the users to manage and visualize the data flow for the ML compute task with simple operations. In some embodiments, the user interface 600B can be based partially on NiFi, and the connectors 642, 644, and 646 can be constructed as NiFi process groups. For example, the SALESFORCE Data connector 644 and the Website Log Data connector 646 can be the local connector 204, and the Forecast connecter can be the cloud connector 220. In this example based on a request for training a ML model to show a correlation between sales data and company website log data, the SALESFORCE Data connector 644 and the Website Log Data connector 646 can scan data from SALESFORCE software and local server logs, respectively. Then, the SALESFORCE Data connector 644 and the Website Log Data connector 646 transmits the scanned data to the Forecast connector 642.

Figure 6C:
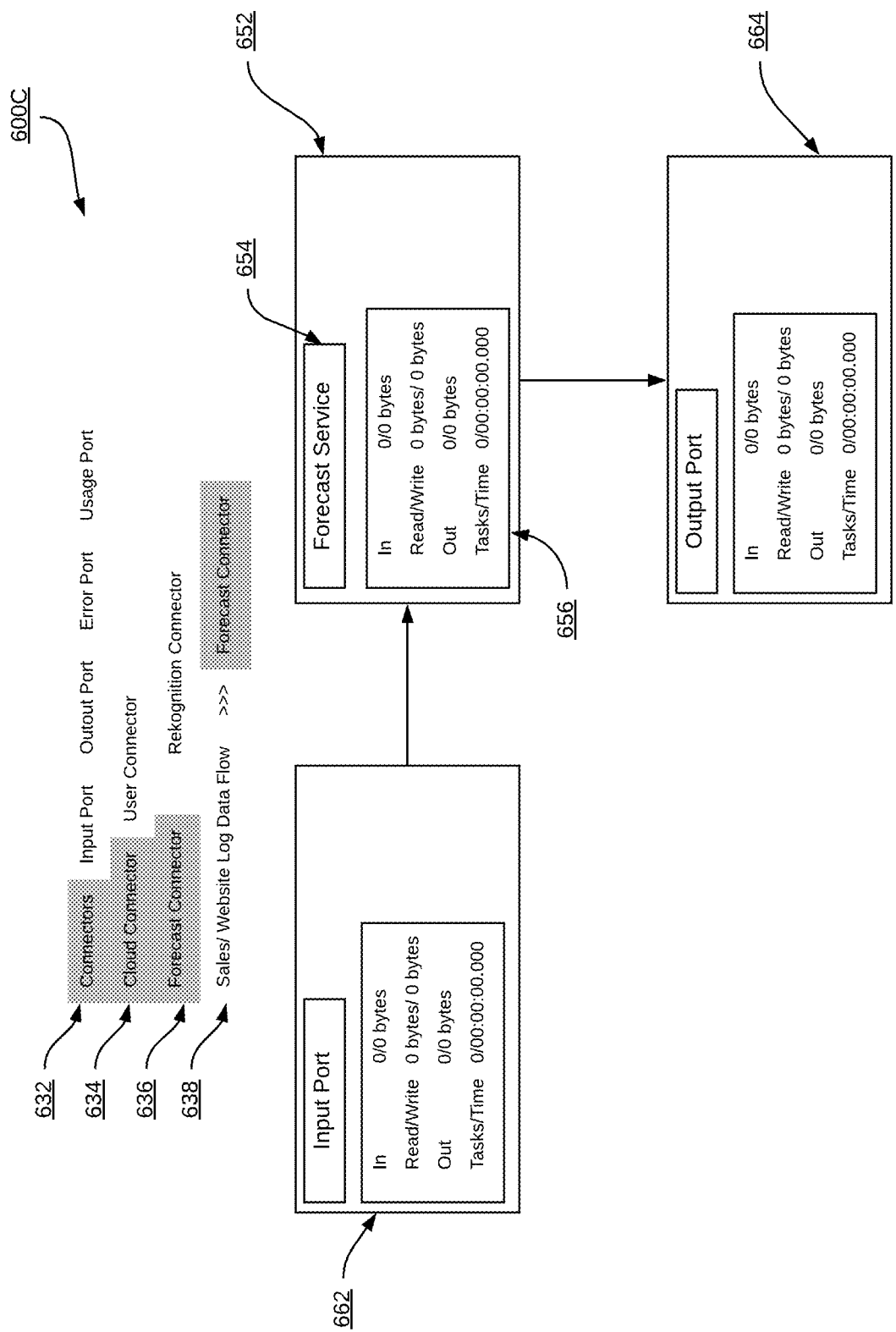
FIG. 6C illustrates another example user interface in accordance with various embodiments.

FIG. 6C illustrates an example user interface 600C in accordance with various embodiments of the present technology. However, one of ordinary skill in the art will understand that, for the user interface 600C and any other presentation system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. User interface 600C is similar to user interface 600B, redundant descriptions will be omitted. In some embodiments, after the user selects the Forecast connector 642 in user interface 600B, user interface 600C will be displayed.

In FIG. 6C, the directory of connectors 638 displays the hierarchy of connectors included in the data flow. "Sales/Website Log Data Flow" and "Forecast Connector" are names selected by the user and can be changed by the user. In this example, the Forecast connector 642 is being created one level below the "Sales/Website Log Data Flow." When the user selects the Forecast connector 642 in the user interface 600B, the Forecast Service 652, the input port 662, and the output port 664 will be displayed as a detailed diagram of the Forecast connector 642.

In some embodiments, the Forecast connector 642 is the cloud connector 220. For example, the connectors can be structured based on NiFi Process Groups, and can then provide external ports for input, output, and other data flows. Each NiFi Process Groups based connector can include data ports such as an input port, output port, error port, and usage port as displayed in the main menu 632. In some embodiments, a connector should include an input port, output port, error port, and usage port. In some embodiments, a connector can also include a connector specific port.

The input port 662 controls inbound data flow from all supported operations into the connector. In an example of NiFi Process Groups based connector, a unique command code ("opcode") should be present as a NiFi FlowFile attribute for the inbound data flow. The opcode attribute can be a text string that indicates an action or command to be executed by the corresponding internal process group of the connector. In some embodiments, operands can be included as additional FlowFile attributes and FlowFile content. These operands are unique and can be interpreted by each corresponding opcode processor flow. After receiving the inbound data flow, the connector validates the content type of all inbound data flow. Examples of content types that can be processed by the connectors include, but are not limited to, CSV text, DOC text, JPEG image, MPEG video, and ZIP compressed file. In some embodiments, connectors can perform transformation operations on input data using the content-type attribute to determine which transformation operations should be applied to the input data.

The output port 664 controls outbound data flow from a connector. In some embodiments, to prevent complex routing issue in the downstream, each connector can include one output port as a default port for outbound data, but also include other ports to control outbound data as well.

The error port controls the error data flow. In some embodiments, data flow from the error port contains an original opcode or a port name to indicate which opcode failed or succeeded, and additional error details.

The usage port controls a metered usage information flow of the connector. Such metered usage information flow can record the billing information for the corresponding connector. In some embodiments, a connector can also include other ports corresponding to different services provided by the connector.

Figure 7:
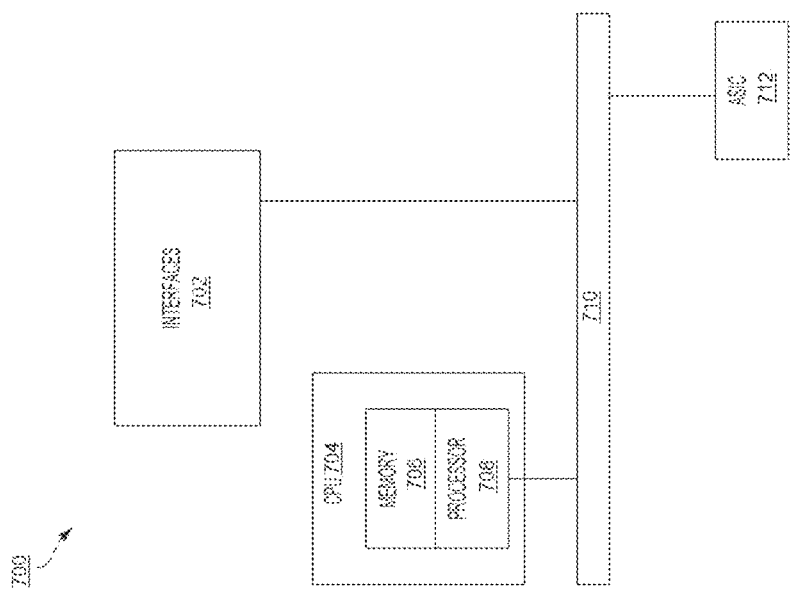
FIG. 7 illustrates an example of a network device in accordance with various embodiments.

FIG. 7 illustrates an example of a network device 700 (e.g., switch, router, network appliance, etc.). Such a network device 700 can be the routers included at the edge location 208, the destination compute node 210, or connectors 204, 206, 214, 216, and 218. The network device 700 can include a master central processing unit (CPU) 704, interfaces 702, and a bus 710 (e.g., a PCI bus). When acting under the control of appropriate software or firmware, the CPU 704 can be responsible for executing packet management, error detection, and/or routing functions. The CPU 704 preferably accomplishes all these functions under the control of software including an operating system and any appropriate applications software. The CPU 704 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 706 (such as non-volatile RAM and/or ROM) can also form part of the CPU 704. However, there are many different ways in which memory could be coupled to the system.

The interfaces 702 can be provided as interface cards (sometimes referred to as line cards). The interfaces 702 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 702 may also include an independent processor and, in some instances, volatile RAM. The independent processors may control communication intensive tasks such as packet switching, media control, and management. By providing separate processors for the communication intensive tasks, the interfaces 702 may allow the CPU 704 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 706) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
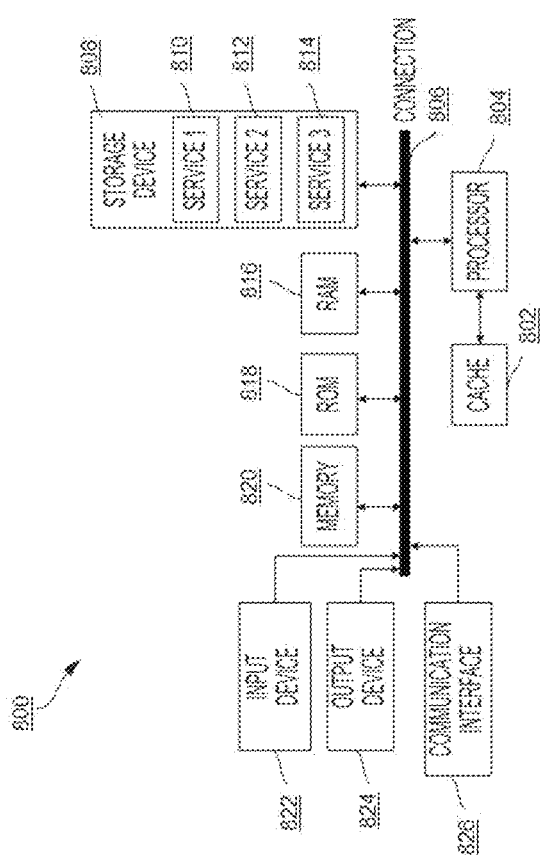
FIG. 8 illustrates an example of a computing system in accordance with various embodiments.

FIG. 8 illustrates an example of a bus computing system 800 wherein the components of the system are in electrical communication with each other using a bus 806. This can be part or all of the local service architecture 200 and the cloud service based network architecture 300. The computing system 800 can include a processing unit (CPU or processor) 804 and a system bus 806 that may couple various system components including the system memory 820, such as read only memory (ROM) 818 and random access memory (RAM) 816, to the processor 804. The computing system 800 can include a cache 802 of high-speed memory connected directly with, in close proximity to, or integrated as part of the processor 804. The computing system 800 can copy data from the memory 820, ROM 818, RAM 816, and/or storage device 808 to the cache 802 for quick access by the processor 804. In this way, the cache 802 can provide a performance boost that avoids processor delays while waiting for data. These and other modules can control the processor 804 to perform various actions. Other system memory 820 may be available for use as well. The memory 820 can include multiple different types of memory with different performance characteristics. The processor 804 can include any general purpose processor and a server, a hardware module or software module, such as module 810, module 812, and module 814 stored in the storage device 808, configured to control the processor 804 as well as a special-purpose processor where software instructions are incorporated into the actual processor design. The processor 804 may essentially be a completely self-contained computing system, containing multiple cores or processors, a bus, memory controller, cache, etc. A multi-core processor may be symmetric or asymmetric.

To enable user interaction with the computing system 800, an input device 822 can represent any number of input mechanisms, such as a microphone for speech, a touch-protected screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system 800. The communications interface 826 can govern and manage the user input and system output. There may be no restriction on operating on any particular hardware arrangement and therefore the basic features here may easily be substituted for improved hardware or firmware arrangements as they are developed.

The storage device 808 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 808 can include the service or software modules 810, 812, 814 for controlling the processor 804. Other hardware or software modules are contemplated. The storage device 808 can be connected to the system bus 806. In some embodiments, a hardware module that performs a particular function can include a software component stored in a computer-readable medium in connection with the necessary hardware components, such as the processor 804, bus 806, output device 824, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving a selected machine learning task and one or more file pointers, each file pointer indicating a network location;
for each given file pointer of the one or more file pointers:
ingesting, input data from the network location indicated by the given file pointer; and
labeling, the input data with a label generated based on the given file pointer and the selected machine learning task; and
generating, a machine learning compute request, wherein the machine learning compute request comprises control information specifying one or more parameters for the selected machine learning task and a machine learning dataset generated from the labeled input data.

2. The method of claim 1, further comprising:
determining, based on the control information of the machine learning compute request and a type of the selected machine learning task, a cloud connector for the machine learning compute request;

constructing, a plurality of cloud services for the machine learning compute request, the constructing based at least in part on the control information of the machine learning compute request; and processing, the machine learning compute request by providing the machine learning dataset to one or more of the constructed plurality of cloud services.

3. The method of claim 2, further comprising:

transmitting the machine learning compute request to the cloud connector associated with the type of the selected machine learning task; and managing, the construction of the plurality of cloud services and the processing of the machine learning compute request.

4. The method of claim 3, further comprising generating, a cloud formation template (CFT), wherein the CFT triggers the construction of the plurality of cloud services and controls the processing of the machine learning compute request based on the control information.

5. The method of claim 1, wherein ingesting input data further comprises applying one or more transformation operations, to the ingested input data, the one or more transformation operations selected based a type of the selected machine learning task.

6. The method of claim 1, wherein the labels are generated for the input data based further on a configuration mapping between given ones of the file pointers and required input formats of the selected machine learning task, the configuration mapping is received from the at least one of local connecters.

7. The method of claim 1, wherein the network location comprises a network accessible folder.

8. A non-transitory computer-readable storage medium comprising stored therein instructions which, when executed by one or more processors, cause the one or more processors to:

determine, based on control information of a machine learning compute request and a type of the selected machine learning task, a cloud connector for the machine learning compute request;

construct, a plurality of cloud services for the machine learning compute request, the constructing based at least in part on the control information of the machine learning compute request; and process, the machine learning compute request by providing a machine learning dataset to one or more of the constructed plurality of cloud services.

9. The non-transitory computer readable medium of claim 8, wherein the instructions are further effective to cause the one or more processors to:

receive a selected machine learning task and one or more file pointers, each file pointer indicating a network location;

for each given file pointer of the one or more file pointers:

ingest, input data from the network location indicated by the given file pointer; and label, input data with a label generated based on the given file pointer and the selected machine learning task; and generate, the machine learning compute request, wherein the machine learning compute request comprises the control information specifying one or more parameters for the selected machine learning task and the machine learning dataset generated from the labeled input data.

10. The non-transitory computer readable medium of claim 9, wherein the instructions are further effective to cause the one or more processors to:

transmit the machine learning compute request to the cloud connector associated with the type of the selected machine learning task; and manage, the construction of the plurality of cloud services and the processing of the machine learning compute request.

11. The non-transitory computer readable medium of claim 10, wherein the instructions are further effective to cause the one or more processors to:

generate, a cloud formation template (CFT), wherein the CFT triggers the construction of the plurality of cloud services and controls the processing of the machine learning compute request based on the control information.

12. The non-transitory computer readable medium of claim 9, wherein the instructions are effective to cause the one or more processors to ingest input data further comprises:

apply one or more transformation operations to the ingested input data, the one or more transformation operations selected based a type of the selected machine learning task.

13. The non-transitory computer readable medium of claim 9, wherein the labels are generated for the input data based further on a configuration mapping between given ones of the file pointers and required input formats of the selected machine learning task, the configuration mapping is received from the at least one of local connecters.

14. The non-transitory computer readable medium of claim 9, wherein the instructions are effective to cause the one or more processors to: process the input data to yield a summarized input data based on the selected machine learning task, wherein a size of the summarized input data is smaller than a size of the input data.

15. A system comprising:

one or more processors; and at least one computer-readable storage medium including instructions stored thereon, the instructions which, when executed by the one or more processors, cause the one or more processors to:

receive a selected machine learning task and one or more file pointers, each file pointer indicating a network location;

for each given file pointer of the one or more file pointers:

ingest, by a local connecter, input data from the network location indicated by the given file pointer; and label, by at least one of local connecters, the input data with a label generated based on the network location of the input data and the selected machine learning task to yield labeled input data, wherein the input data is organized into network locations corresponding to the label; and generate, by the local connecter, a machine learning compute request, the machine learning compute request comprising control information specifying one or more parameters for the selected machine learning task and a machine learning dataset generated from the labeled input data.

16. The system of claim 15, wherein the instructions further cause the one or more processors to:

determine, at a destination compute node based on the control information of the machine learning compute request and a type of the selected machine learning task, a cloud connector for the machine learning compute request;

construct, at the cloud connector, a plurality of cloud services for the machine learning compute request, the constructing based at least in part on the control information of the machine learning compute request; and process, at the cloud connector, the machine learning compute request by providing the machine learning dataset to one or more of the constructed plurality of cloud services.

17. The system of claim 16, wherein the instructions further cause the one or more processors to:

transmit the machine learning compute request to the cloud connector associated with the type of the selected machine learning task; and manage, via the cloud connector, the construction of the plurality of cloud services and the processing of the machine learning compute request.

18. The system of claim 17, wherein the instructions further cause the one or more processors to:

generate, via the cloud connector, a cloud formation template (CFT), wherein the CFT triggers the construction of the plurality of cloud services and controls the processing of the machine learning compute request based on the control information.

19. The system of claim 15, wherein the instructions to ingest input data further comprises instructions that cause the one or more processors to:

apply one or more transformation operations, by the local connecter, to the ingested input data, the one or more transformation operations selected based on the type of the selected machine learning task.

20. The system of claim 15, wherein the labels are generated for the input data based further on a mapping between the network location of the input data and required input formats of the selected machine learning task, the configuration mapping is received by the local connecter.

\* \* \* \* \*